United States Patent
Shimomura et al.

(10) Patent No.: US 7,336,303 B2
(45) Date of Patent: Feb. 26, 2008

(54) IMAGING DEVICE

(75) Inventors: Kenichi Shimomura, Tokyo (JP); Yoshikazu Kondo, Tokyo (JP); Youichi Kato, Tokyo (JP); Kenji Watanabe, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 1086 days.

(21) Appl. No.: 10/347,585

(22) Filed: Jan. 22, 2003

(65) Prior Publication Data
US 2004/0017596 A1 Jan. 29, 2004

(30) Foreign Application Priority Data
Jul. 26, 2002 (JP) ............... 2002-218534

(51) Int. Cl.
*H04N 5/262* (2006.01)
(52) U.S. Cl. .................................. 348/240.2
(58) Field of Classification Search ............ 348/240.2, 348/222.1, 240.99
See application file for complete search history.

(56) References Cited

U.S. PATENT DOCUMENTS

| | | | | |
|---|---|---|---|---|
| 4,910,599 A | * | 3/1990 | Hashimoto | ............... 348/240.2 |
| 4,963,981 A | * | 10/1990 | Todaka et al. | ........... 348/240.2 |
| 5,019,912 A | | 5/1991 | Matsuda | |
| 5,253,064 A | * | 10/1993 | Yamamoto et al. | ...... 348/240.2 |
| 5,428,390 A | | 6/1995 | Cooper et al. | |
| 5,602,870 A | * | 2/1997 | Hailey et al. | ............... 375/230 |
| 6,542,201 B1 | * | 4/2003 | Song et al. | ................. 348/561 |
| 6,801,252 B1 | * | 10/2004 | Kawada et al. | .......... 348/240.2 |

FOREIGN PATENT DOCUMENTS

| | | |
|---|---|---|
| EP | 0 335 751 | 10/1989 |
| EP | 0 989 746 | 3/2000 |
| JP | 6-334926 | 12/1994 |
| JP | 2002-112096 | 4/2002 |

OTHER PUBLICATIONS

"Digital Color-Space Processor for CCD Cameras 'CS7666'" Cirrus Logic,Inc. 1998, p. 14.

* cited by examiner

*Primary Examiner*—James M. Hannett
(74) *Attorney, Agent, or Firm*—Leydig, Voit & Mayer, Ltd.

(57) ABSTRACT

An imaging control unit specifies a scan region, including an effective pixel region and a blanking region, of an image based on a magnification for electronic zooming, and converts an input optical signal into an electrical signal by scanning the scan region. The imaging control unit reads the electrical signal stored and delivers the electrical signal to an image sensor unit as picture data. An RW control unit stores the picture data in a register based on the magnification for electronic zooming, and then reads the picture data at a predetermined frame rate. A resolution converter performs interpolation processing of the picture data based on the magnification for electronic zooming.

5 Claims, 5 Drawing Sheets

FIG.5
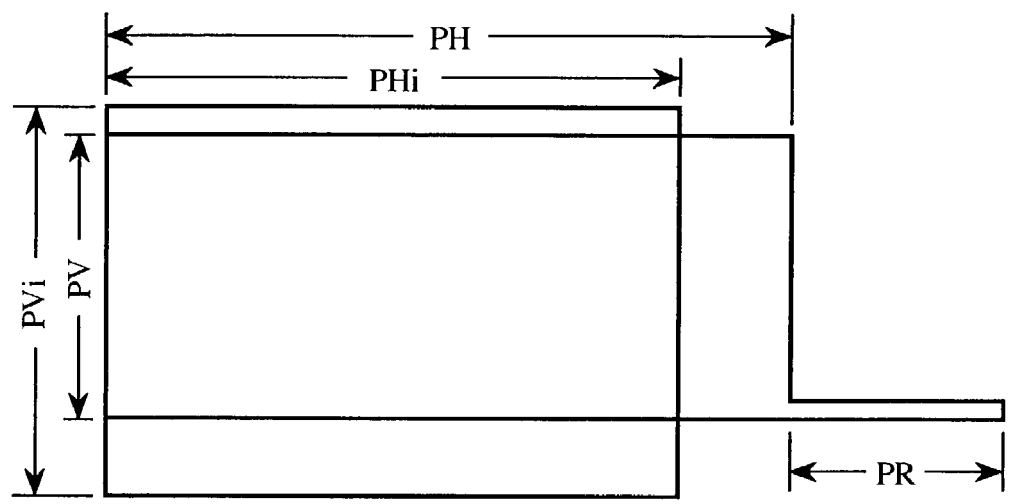
FIG.6A
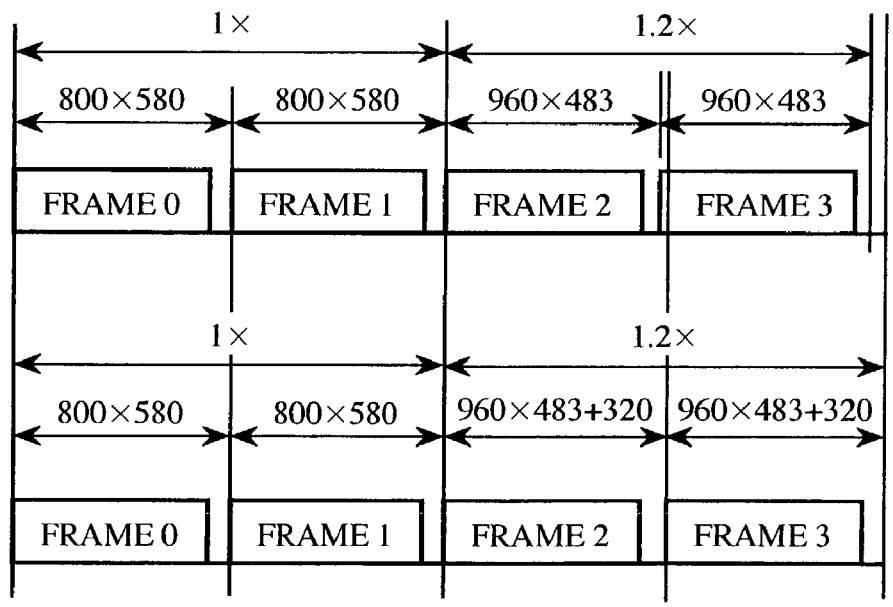
FIG.6B

IMAGING DEVICE

BACKGROUND OF THE INVENTION

1. Field of the Invention

The present invention relates to an imaging device having an electronic zooming function of zooming in an image.

2. Description of Related Art

FIG. 7 is a block diagram showing the structure of a prior art imaging device. In the figure, reference numeral 11 denotes an image sensor unit that converts an input optical signal into an electrical signal, stores it therein, reads the electrical signal stored therein, and outputs it as picture data, and reference numeral 12 denotes an imaging control unit that specifies a predetermined scan region which consists of an effective pixel region and a blanking region within the image sensor unit 11, and controls the scanning timing at which the image sensor unit 11 scans the scan region.

In the figure, reference numeral 13 denotes a frame memory provided with a memory A and a memory B (not shown in the figure) each of which holds one frame of picture data delivered from the image sensor unit 11, reference numeral 14 denotes a magnification specification unit that specifies a magnification for electronic zooming, reference numeral 15 denotes an RW (read write) control unit that writes the picture data delivered from the image sensor unit 11 in the frame memory 13, and reads one frame of the picture data or a part of the picture data held by the frame memory 13 based on the magnification for electronic zooming specified by the magnification specification unit 14, and reference numeral 16 denotes a resolution converter that performs an interpolation processing on the part of the picture data read from the frame memory 13 based on the magnification for electronic zooming specified by the magnification specification unit 14, converts it into picture data having a size of one frame, and delivers the picture data as a video signal.

Next, a description will be made as to the operation of the prior art imaging device. FIG. 8 is a diagram for explaining the scan size specified by the image sensor unit 11 of the imaging control unit 12. As shown in the figure, the scan size consists of an effective pixel region from which the picture data is output and a blanking region from which no picture data is output. FIG. 8 shows the effective pixel region having pa size of 640×480 pixels, which corresponds to a so-called VGA (Variable Graphics Array) and the scan size having a size of 800×600 pixels.

The imaging control unit 12 specifies the predetermined scan region for the image, sensor unit 11, and controls the scanning timing at which the image sensor unit 11 scans the scan region. The image sensor unit 11 converts an optical signal applied thereto into an electrical signal by scanning the scan region specified by the imaging control unit 12 based on the scanning timing from the imaging control unit 12, and stores the electrical signal therein. The image sensor unit 11 then reads the electrical signal that has been stored therein, and outputs it as picture data. FIG. 9 is a diagram showing a way in which the image sensor unit 11 scans the scan region specified by the imaging control unit 12.

First of all, the description will be directed to a case where the magnification specification unit 14 sets the magnification for electronic zooming to 1×. The RW control unit 15 writes one frame of picture data delivered from the image sensor unit 11 in the memory A of the frame memory 13 at a certain timing regardless of the magnification for electronic zooming specified by the magnification specification unit 14. The RW control unit 15 then writes the next frame of the picture data in the memory B of the frame memory 13 at the next timing. Thus, the picture data delivered from the image sensor unit 11 is written in the frame memory 13 on a frame-by-frame basis regardless of the magnification for electronic zooming specified by the magnification specification unit 14.

When writing one frame of the picture data in the memory B of the frame memory 13, the RW control unit 15 reads one frame of the picture data which has been written and held in the memory A based on the 1× magnification for electronic zooming specified by the magnification specification unit 14, and then reads one frame of the picture data held in the memory B of the frame memory 13 at the next timing.

FIG. 10 is a diagram for explaining reading and writing of data from and in the frame memory 13 when the magnification for electronic zooming is set to 1×. Thus, when the magnification for electronic zooming is 1×, the whole of one frame of the picture data held in the memory A or the memory B can be read out. In this way, frames of the picture data are sequentially written in the frame memory 13 one by one, and are read out one by one and are delivered to the resolution converter 16.

The resolution converter 16 outputs frames of the picture data read from the frame memory 13 one by one, without change, as a video signal based on the 1× magnification for electronic zooming specified by the magnification specification unit 14.

Next, a description is given for an example where the magnification specification unit 14 sets the magnification for electronic zooming at 2× for a central part of one frame of the picture data. The RW control unit 15 writes one frame of the picture data delivered from the image sensor unit 11 in the memory A of the frame memory 13 at a certain timing regardless of the magnification for electronic zooming specified by the magnification specification unit 14. The RW control unit 15 then writes the next frame of the picture data in the memory B of the frame memory 13 at the next timing. Thus, frames of the picture data delivered from the image sensor unit 11 are written into the frame memory 13 one by one regardless of the magnification for electronic zooming specified by the magnification specification unit 14.

When writing one frame of the picture data in the second memory B of the frame memory 13, the RW control unit 15 reads the central part having a fourth of one frame of the picture data written and held in the first memory A based on the 2× magnification for electronic zooming specified by the magnification specification unit 14. The RW control unit 15 then reads the central part having a fourth of one frame of the picture data written in the second memory B of the frame memory 13 at the next timing. FIG. 11 is a diagram for explaining reading and writing of data from and in the frame memory 13 when the magnification for electronic zooming is set to 2×. Thus, frames of the picture data are written in the frame memory 13 one by one and the central part having a fourth of each frame of the picture data is read out and is delivered to the resolution converter 16.

The resolution converter 16 performs an interpolation processing based on the 2× magnification for electronic zooming specified by the magnification specification unit 14 so that the central part of each frame of the picture data read from the frame memory 13 is enlarged twice in vertical and horizontal directions. Finally, the resolution converter 16 makes the central part have the same size as that of one frame of the picture data and delivers it as a video signal.

Next, the data rate at which the picture data held in the frame memory 13 is read will be explained. When the magnification for electronic zooming is set to 1×, the RW control unit 15 reads one frame of the picture data held in the frame memory 13 at the same data rate as that at which the picture data is written into the frame memory, and the resolution converter 16 delivers a corresponding video signal at a predetermined frame rate.

On the other hand, when the magnification for electronic zooming is set to 2×, in order to keep the frame rate constant, the RW control unit 15 reads the picture data on the central part held in the frame memory 13 at a fourth of the data rate at the time of writing. This is because the amount of the picture data to be read is reduced to a fourth of the data amount of the picture data written into the frame memory.

Thus, when the magnification for electronic zooming is set to other than 1×, it is necessary to change the data rate at the time of writing and that at the time of reading to keep the frame rate constant, and it is necessary to provide the frame memory 13 with memories A and B for holding two frames of picture data. For example, in the case of VGA, the effective pixel region has a size of 640×480 about 300,000 pixels, so a 2-port RAM having a capacity of about 4.8 Mbits or two single-port RAMs each having a capacity of about 2.4 Mbits, is needed to hold two frames of picture data.

In other words, the prior art imaging device can keep the frame rate constant regardless of the magnification for electronic zooming when delivering the picture data finally enlarged according to the magnification for electronic zooming by changing the data rate at the time of reading the picture data from the frame memory 13 according to the magnification for electronic zooming.

A problem with the prior art imaging device constructed as mentioned above is that there is a necessity to install a large-capacity frame memory 13 in order to keep the frame rate constant when performing electronic zooming, thereby increasing power consumption, the size of the imaging device, and the cost. Particularly, it is difficult to apply such a prior art imaging device to mobile equipment.

SUMMARY OF THE INVENTION

The present invention is proposed to solve the above-mentioned problems, and it is therefore an object of the present invention to provide an imaging device that can keep the frame rate constant when performing electronic zooming without having to use a large-capacity frame memory, and that can be applied to mobile equipment.

In accordance with an aspect of the present invention, there is provided an imaging device including: a mechanism for converting an input optical signal into an electrical signal by scanning a scan region specified based on a magnification for electronic zooming, for storing the electrical signal therein, for reading the electrical signal stored therein, and for outputting it as picture data, a mechanism for storing the picture data therein based on the magnification for electronic zooming and for reading the picture data at a predetermined frame rate; and a mechanism for performing an interpolation processing on the read picture data based on the magnification for electronic zooming.

As a result, the present invention offers an advantage of being able to keep the frame rate constant when performing electronic zooming without having to use a large-capacity frame memory.

In accordance with another aspect of the present invention, there is provided an imaging device comprising: an image sensor unit for converting an input optical signal into an electrical signal, for storing the electrical signal therein, for reading the electrical signal stored therein, and for outputting the electrical signal as picture data; a parameter operation unit for calculating imaging parameters associated with electronic zooming based on a magnification for electronic zooming specified by a magnification specification unit; an imaging control unit for specifying a scan region including an effective pixel region and a blanking region, which is to be scanned by the image sensor unit, based on the imaging parameters calculated by the parameter operation unit, and for controlling scanning timing at which the image sensor unit scans the scan region; a register for temporarily holding a part of the picture data output from the image sensor unit; a read write (RW) control unit for writing at least one line of the picture data delivered from the image sensor unit based on the imaging parameters calculated by the parameter operation unit in the register, and for reading at least one line of the picture data held therein at a predetermined frame rate; and a resolution converter for performing an interpolation processing on the picture data read from the register based on the imaging parameters calculated by the parameter operation unit sodas to convert the picture data into picture data having a size of one frame and deliver it as a video signal.

In accordance with a further aspect of the present invention, there is provided an imaging device comprising: a mechanism for converting an input optical signal into an electrical signal by scanning a scan region specified based on a magnification for electronic zooming, for storing the electrical signal therein, for reading the electrical signal stored, and for outputting it as picture data; a mechanism for performing an interpolation processing on the read picture data based on the magnification for electronic zooming; and a mechanism for storing the picture data on which the interpolations processing has been performed therein based on the magnification for electronic zooming and for reading the picture data at a predetermined frame rate.

Further objects and advantages of the present invention will be apparent from the following description of the preferred embodiments of the invention as illustrated in the accompanying drawings.

BRIEF DESCRIPTION OF THE DRAWINGS

FIG. 5 is a diagram for explaining a scan region specified by an imaging control unit of an imaging device according to embodiment 2 of the present invention;

FIGS. 6A and 6B are diagrams for explaining a frame rate when a magnification for electronic zoom is changed in the imaging device according to embodiment 2 of the present invention;

DETAILED DESCRIPTION OF THE PREFERRED EMBODIMENTS

The invention will now be described with reference to the accompanying drawings.

Embodiment 1.

Figure 1:
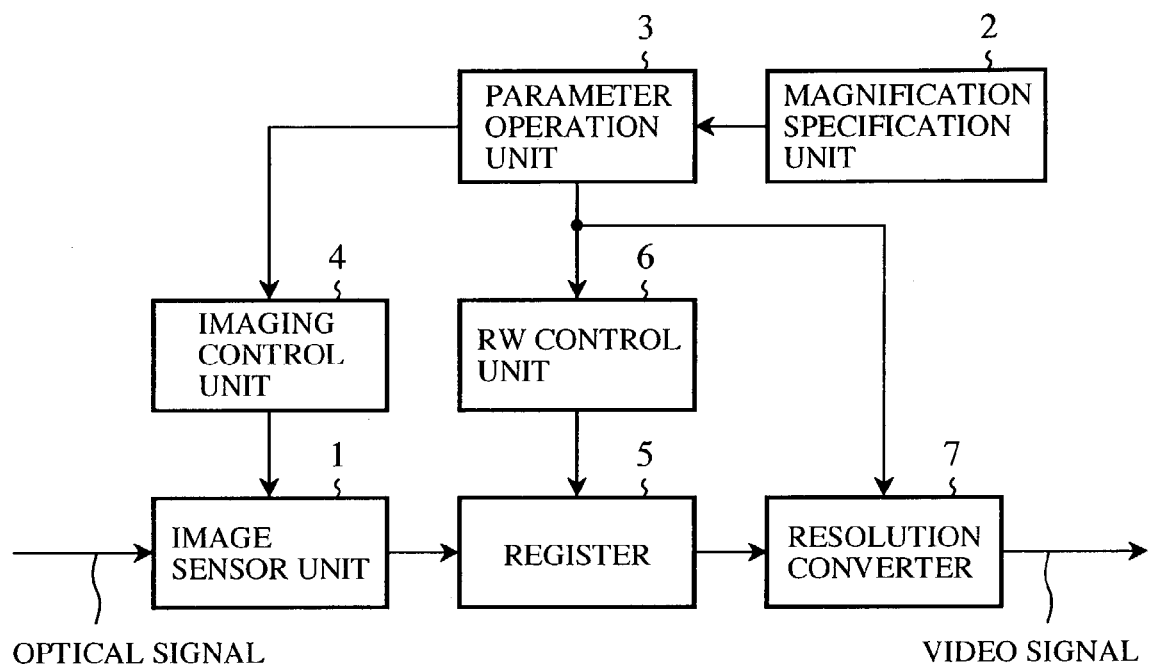
FIG. 1 is a block diagram showing the structure of an imaging device according to embodiment 1 of the present invention.

FIG. 1 is a block diagram showing the structure of an imaging device according to embodiment 1 of the present invention. In the figure, reference numeral 1 denotes an image sensor unit that converts an input optical signal into an electrical signal, stores the electrical signal therein, reads the electrical signal stored therein, and delivers the electrical signal as picture data. The image sensor unit is constructed of a solid-state image sensing device, such as a CCD having a VGA-equivalent 640×480 pixel array structure or a CMOS image sensor. For simplicity, the description about shaded pixels which are always shaded and are placed in the vicinity of an effective pixel region is omitted.

In the figure, reference numeral 2 denotes a magnification specification unit that specifies a magnification for electronic zooming, reference numeral 3 denotes a parameter operation unit that calculates imaging parameters associated with the electronic zooming based on the magnification for electronic zooming specified by the magnification specification unit 2, and reference numeral 4 denotes an imaging control unit for specifying a scan region including an effective pixel region and a blanking region, which is scanned by the image sensor unit 1, based on the imaging parameters calculated by the parameter operation unit 3, and for controlling the scanning timing at which the image sensor unit 1 scans the scan region.

In addition, in FIG. 1, reference numeral 5 denotes a register for temporarily holding one line of the picture data output from the image sensor unit 1. The register 5 has a small capacity of about 17 Kbits and uses an FIFO (First In First Out) or the like that makes a correction to variations in the data rate, which can occur within one horizontal scanning period according to the magnification for electronic zooming. Reference numeral 6 denotes an RW (Read Write) control unit for writing at least one line of the picture data delivered from the image sensor unit 1 in the register 5 based on the imaging parameters calculated by the parameter operation unit 3, and for reading at least one line of the picture data held therein at a predetermined frame rate, and reference numeral 7 denotes a resolution converter for performing an interpolation processing on the picture data read from the register 5 based on the imaging parameters calculated by the parameter operation unit 3 so as to convert the picture data into picture data having a size of one frame and deliver it as a video signal.

Next, a description will be made as to the operation of the imaging device according to embodiment 1 of the present invention. The parameter operation unit 3 calculates the imaging parameters associated with the electronic zooming, i.e., a horizontal scanning period PH defined pixel by pixel, a vertical scanning period PV defined line by line, a vertical scanning start line VSTRT, a number VSIZE of vertically scanned rows, a horizontal scanning start pixel HSTRT, and a number HSIZE of horizontally scanned pixels based on the magnification for electronic zooming specified by the, magnification specification unit 2.

Here, assume that when the magnification for electronic zooming is set to 1×, the horizontal scanning period is PHi, the vertical scanning period is PVi the number of vertically scanned rows is VSIZEi, the number of horizontally scanned pixels is HSIZEi, and the central part of one frame of the picture data is electronically zoomed in N times. The parameter operation unit 3 calculates the horizontal scanning period PH, the vertical scanning period PV, the vertical scanning start line VSTRT, the number VSIZE of vertically scanned rows, the horizontal scanning start pixel HSTRT, and the number HSIZE of horizontally scanned pixels by using the following equations (1) to (6).

$$PH = PHi \times N \tag{1}$$

$$PV = PVi \div N \tag{2}$$

$$VSTRT = VSIZEi \div 2 \times (1 - 1/N) \tag{3}$$

$$VSIZE = VSIZEi \div N \tag{4}$$

$$HSTRT = HSIZEi \div 2 \times (1 - 1/N) \tag{5}$$

$$HSIZE = HSIZEi \div N \tag{6}$$

For example, the above equations (1) to (6) yield PH=1600, PV=300, VSTRT=120, VSIZE=240, HSTRT=160, and HSIZE=320 when assuming that PHi=800, PVi=600, HSIZEi=640, VSIZEi=480, and N=2, where VSTRT is determined when the value of the first line is set to 0 and HSTRT is determined when the value of the first pixel is set to 0.

The imaging control unit 4 specifies the scan region which is to be scanned by the image sensor unit 1, and which includes the effective pixel region and the blanking region based on the imaging parameters calculated by the parameter operation unit 3, i.e., the horizontal scanning period PH, the vertical scanning period PV, the vertical scanning start line VSTRT, and the number VSIZE of vertically scanned rows, and controls the scanning timing at which the image sensor unit 1 scans the scan region.

Figure 2:
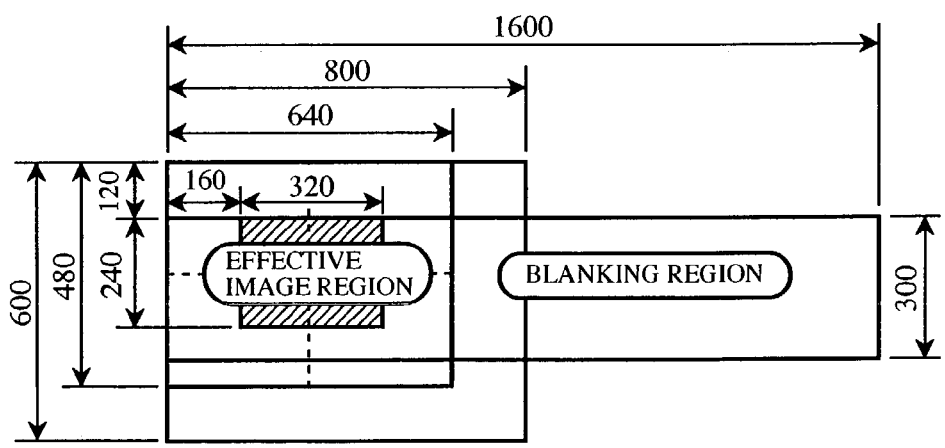
FIG. 2 is a diagram for explaining a scan region specified by an imaging control unit of the imaging device according to embodiment 1 of the present invention.

FIG. 2 is a diagram for explaining the scan region specified by the imaging control unit 4. Assuming that when the magnification for electronic zooming is set to 1×, the horizontal scanning period PHi=800, the vertical scanning period PVi=600, the number of horizontally scanned pixels HSIZEi=640, and the number of vertically scanned rows VSIZEi=480, when the magnification for electronic zooming is set to 2×, the scan region has a size of PH×PV=1600× 300 pixels and consists of the effective pixel region (i.e., region having a size of 640×300 pixels) including a region (i.e., hatched region having a size of 320×240 pixels), which is electronically zoomed, and the blanking region. Furthermore, the vertical scanning start line VSTRT is 120, the number VSIZE of vertically scanned rows is 240, the horizontal scanning start pixel HSTRT is 160, and the number HSIZE of horizontally scanned pixels is 320.

The image sensor unit 1 converts an optical signal applied thereto into an electrical signal by scanning the scan region specified by the imaging control unit 4 based on the scanning timing from the imaging control unit 4, stores the electrical signal therein, and reads the electrical signal stored therein and delivers it as picture data.

The scan region specified by the imaging control unit 4 has a size of 800×600 pixels when the magnification for electronic zooming is set to 1×, and has a size of 1600×300 pixels when the magnification for electronic zooming is set to 2×. In other words, because the scan region has a constant size of 480,000 pixels regardless of the magnification for electronic zooming, the frame rate at which the picture data is delivered from the image sensor unit 1 is kept constant regardless of the magnification for electronic zooming.

The RW control unit 6 writes at least one line of the picture data delivered from the image sensor unit 1 in the register 5 based on the imaging parameters calculated by the parameter operation unit 3, i.e., the horizontal scanning start pixel HSTRT and the number HSIZE of horizontally scanned pixels, and reads at least one line of the picture data held in the register 5 at a predetermined frame rate.

Because the number HSIZEi of horizontally scanned pixels is equal to 640, as shown in FIG. 2, when the magnification for electronic zooming is set to 1×, the RW control unit 6 writes one 640-pixel line of the picture data in the register 5, which consists of an FIFO or the like, and reads the line of the picture data held in the register at a predetermined frame rate. This processing is carried out on a line-by-line basis and one frame of the picture data is delivered to the resolution converter 7 by carrying out the processing for each of 480 rows because VSIZEi is equal to 480.

Because the horizontal scanning start pixel HSTRT is equal to 160 and the number of horizontally scanned pixels HSIZE is equal to 320, as shown in FIG. 2, when the magnification for electronic zooming is set to 2×, the RW control unit 6 writes one 320-pixel line of the picture data in the register 5, which consists of an FIFO or the like, and reads the line of the picture data held in the register at the same frame rate as that set in the case of the 1× magnification for electronic zooming. This processing is carried out on a line-by-line basis and part of one frame of the picture data associated with the electronically-zoomed region is delivered to the resolution converter 7 by carrying out the processing for each of 240 rows because VSIZEi is equal to 240.

Figure 3:
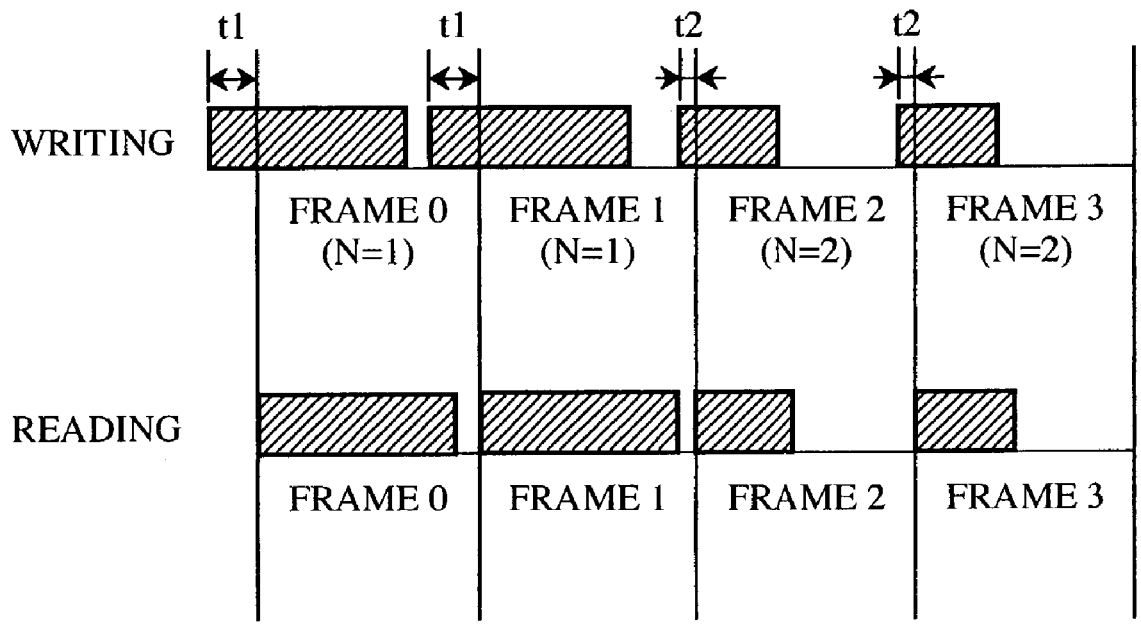
FIG. 3 is a timing chart showing writing and reading of picture data in and from a register by an RW control unit of the imaging device according to embodiment 1 of the present invention.

FIG. 3 is a timing chart showing writing and reading of the picture data in and from the register 5 by the RW control unit 6. As previously mentioned, although the RW control unit 6 reads one line of the picture data after writing it in the register 5, the RW control unit has to start writing it in the register 5 at an earlier time as the one line of the picture data has a larger number of pixels in order to read it at the same frame rate regardless of the magnification for electronic zooming.

In other words, as shown in FIG. 3, the time t1 between starting writing data on each of frames 0 and 1 having a large number of pixels for each line in the register 5 and starting reading the data from the register when the magnification for electronic zooming is set to 1× (N=1) is larger than the time t2 between starting writing data on each of frames 2 and 3 having a small number of pixels for each line in the register 5 and starting reading the data from the register when the magnification for electronic zooming is set to 2× (N=2) (i.e., t1>t2). Thus, in order to keep the frame rate constant regardless of the magnification for electronic zooming, the register 5, such as an FIFO, makes a correction to variations in the data rate, which occur according to the magnification for electronic zooming.

The resolution converter 7 performs an interpolation processing on the picture data read from the register 5 based on the imaging parameters, i.e., the horizontal scanning start pixel HSTRT and the number HSIZE of horizontally scanned pixels calculated by the parameter operation unit 3 so as to convert the picture data into picture data having a size of one frame, and then delivers it as a video signal.

In other words, because the number of horizontally scanned pixels HSIZEi is equal to 640 and the number of vertically scanned rows VSIZEi is equal to 480 when the magnification for electronic zooming is set to 1×, the resolution converter 7 delivers one frame of the picture data as the video signal without performing the interpolation processing on the picture data read from the register 5.

On the other hand, because the number of horizontally scanned pixels HSIZE is equal to 320 and the number of vertically scanned rows VSIZE is equal to 240 when the magnification for electronic zooming is set to 2×, the resolution converter 7 enlarges the picture data read from the register 5 twice in vertical and horizontal directions so as to convert it into picture data having a size of one frame, and delivers it as the video signal.

Figure 4:
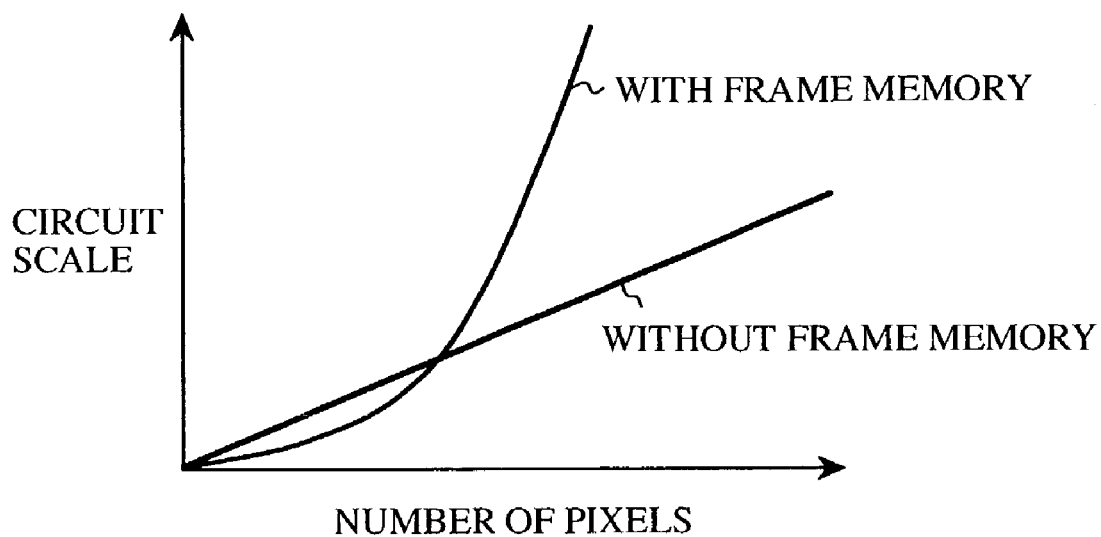
FIG. 4 is a diagram for explaining the circuit scale of the imaging device, which depends upon the presence or absence of a frame memory, with respect to the number of pixels included in an image sensor unit.
Figure 7:
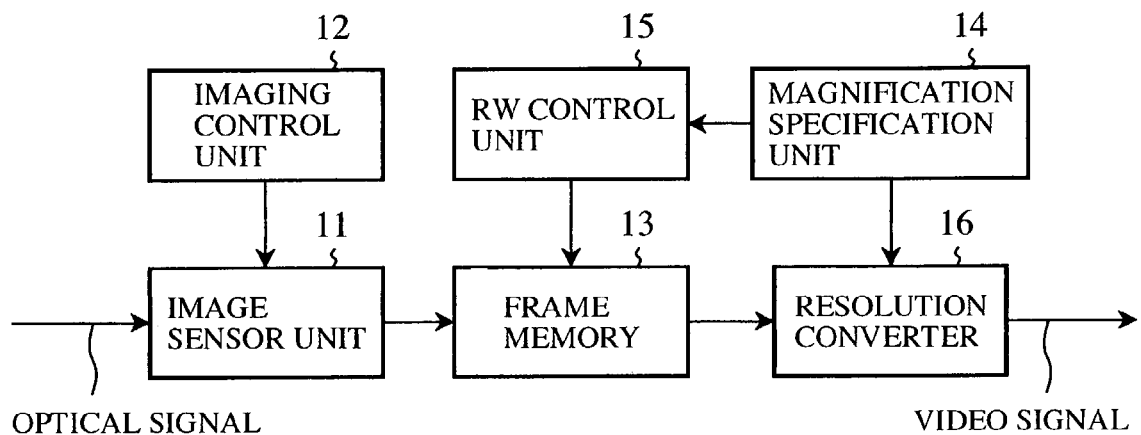
FIG. 7 is a block diagram showing the structure of a prior art imaging device.
Figure 8:
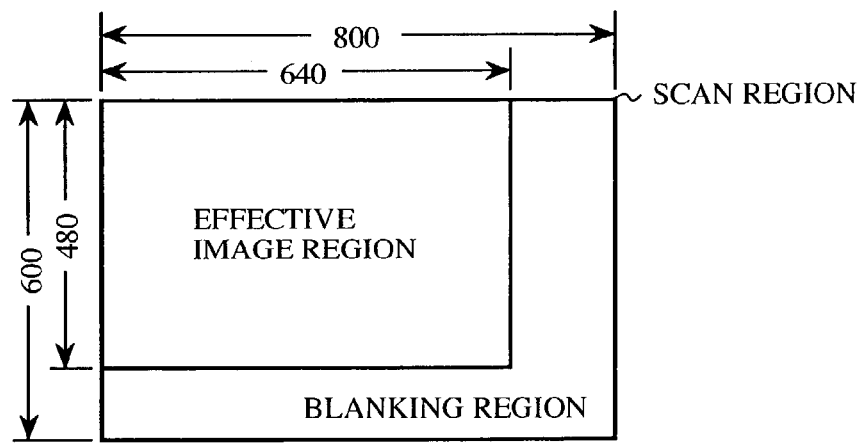
FIG. 8 is a diagram for explaining a scan region specified by an imaging control unit for an image sensor unit.
Figure 9:
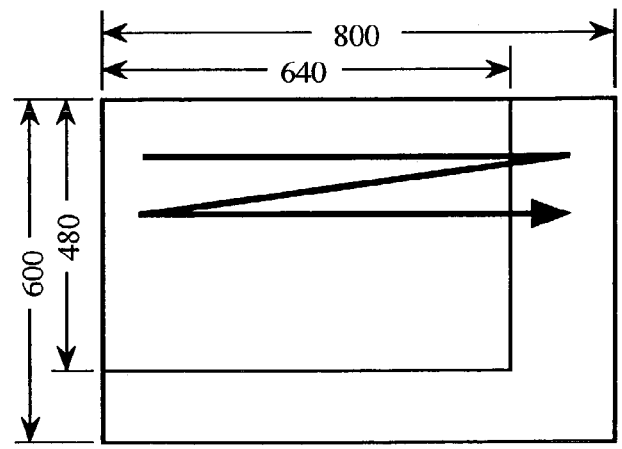
FIG. 9 is a diagram showing a way in which the image sensor unit scans the scan region specified by the imaging control unit.
Figure 10:
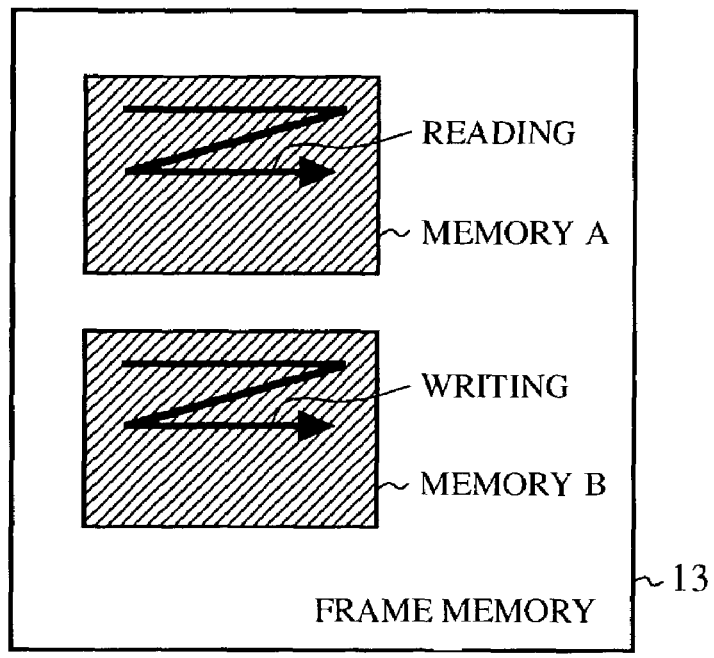
FIG. 10 is a diagram for explaining reading and writing of data from and in a frame memory when the magnification for electronic zooming is set to 1×.
Figure 11:
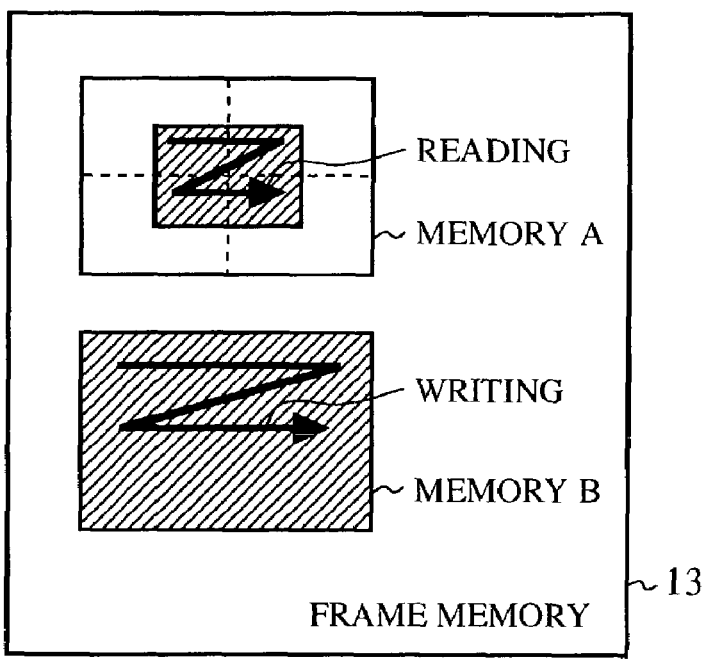
FIG. 11 is a diagram for explaining reading and writing of data from and in the frame memory when the magnification for electronic zooming is set to 2×.

The imaging device having the above-mentioned structure can keep the frame rate constant when performing the electronically zooming without having to use the frame memory 13 having a large storage amount of 4 Mbits, unlike the prior art one. FIG. 4 is a diagram for explaining the circuit scale of the imaging device, which depends upon the presence or absence of the frame memory 13, with respect to the number of pixels included in the image sensor unit 1. In accordance with this embodiment 1, the image sensor unit 1 has a size of 640×480 pixels which is a so-called VGA size. However, as the number of pixels included in the image sensor unit 1 increases and therefore the resolution increases, as shown in FIG. 4, the circuit scale of the imaging device can be effectively reduced because no frame memory 13 is used.

In accordance with this embodiment 1, the resolution converter 7 performs the zooming operation by defining the central part of one frame of the picture data, that is, the central point of the frame as the center of the frame when performing the electronic zooming. In contrast, when performing the zooming operation by horizontally offsetting the frame, by only HOFS from the center of the frame and vertically offsetting the frame by only VOFS from the center of the frame, the parameter operation unit 3 calculates the vertical scanning start line VSTRT and the horizontal scanning start pixel HSTRT by using the following equations (7) and (8).

$$VSTRT = VSIZEi \div 2 \times (1-1/N) + VOFS \qquad (7)$$

$$HSTRT = HSIZEi \div 2 \times (1-1/N) + HOFS \qquad (8)$$

In the above description about this embodiment 1, the case where the magnification for electronic zooming is changed from 1× to N× is explained. In a case of changing the magnification for electronic zooming from N1× to N2×, the imaging device performs in a way described below.

Assuming that when the magnification for electronic zooming is set to N1×, the horizontal scanning period is PH1, the vertical scanning period is, PV1, the vertical scanning start line is VSTRT1, the number of vertically scanned rows is VSIZE1, the horizontal scanning start pixel is HSTRT1, the number of horizontally scanned pixels is HSIZE1, and the central part of one frame of the picture data is electronically zoomed in N2 times, the parameter operation unit 3 calculates the horizontal scanning period PH2, the vertical scanning period PV2, the vertical scanning start line VSTRT2, the number VSIZE2 of vertically scanned rows, the horizontal scanning start pixel HSTRT2, and the number HSIZE2 of horizontally scanned pixels for the N2× magnification for electronic zooming by using the following equations (9) to (14).

$$PH2=PH1\times(N2/N1) \quad (9)$$

$$PV2=PV1\div(N2/N1) \quad (10)$$

$$VSTRT2=VSIZE1\div2\times(1-N1/N2) \quad (11)$$

$$VSIZE2=VSIZE1\div(N2/N1) \quad (12)$$

$$HSTRT2=HSIZE1\div2\times(1-N1/N2) \quad (13)$$

$$HSIZE2=HSIZE1\div(N2/N1) \quad (14)$$

In addition, when increasing the magnification for electronic zooming from N1× to N2× and performing the zooming operation by defining the center of one frame by horizontally offsetting the frame by only HOFS from the center of the frame, and vertically offsetting the frame by only VOFS from the center of the frame, the parameter operation unit 3 calculates the vertical scanning start line VSTRT2 and the horizontal scanning start pixel HSTRT2 by using the following equations (15) and (16).

$$VSTRT2=VSIZE1\div2\times(1-N1/N2)+VOFS \quad (15)$$

$$HSTRT2=HSIZE1\div2\times(1-N1/N2)+HOFS \quad (16)$$

As mentioned above, in accordance with this embodiment 1, the imaging control unit 4 specifies a scan region including an effective pixel region and a blanking region based on a specified magnification for electronic zooming so that the scan region has a size that is kept constant even if the magnification changes, the image sensor unit 1 converts an input optical signal into an electrical signal by scanning this scan region and stores the electrical signal therein, and reads the electrical signal stored therein and delivers it as picture data, and the RW control unit 6 temporarily stores the picture data in the register 5 based on the magnification for electronic zooming and reads it at a predetermined frame rate. Therefore, the present embodiment offers an advantage of being able to keep the frame rate constant when performing electronic zooming without having to use a frame memory having a large storage amount by making a correction to variations in the data rate, which occur according to a change in the magnification for electronic zooming of the picture data delivered from the image sensor unit 1.

In a variant of this embodiment 1 shown in FIG. 1, the resolution converter 7 can be placed between the image sensor unit 1 and the register 5 and perform an interpolation processing on the picture data read from the image sensor unit 1 based on the magnification for electronic zooming, and the RW control unit 6 can temporarily store the picture data on which the interpolation processing has been performed in the register 5 based on the magnification for electronic zooming and read it at a predetermined frame rate. Even in this case, the imaging device can keep the frame rate constant when performing electronic zooming.

Embodiment 2.

An imaging device according to embodiment 2 of the present invention has the same structure as that of above-mentioned embodiment 1 as shown in FIG. 1. In accordance with embodiment 1, although it is assumed that the horizontal scanning period PH and the vertical scanning period PV which specify the scan region controlled according to the magnification for electronic zooming to be integers, neither the horizontal scanning period PH nor the vertical scanning period PV are necessarily integers according to the magnification for electronic zooming. Even when neither the horizontal scanning period PH nor the vertical scanning period PV are integers, the imaging device according to this embodiment 2 can keep the frame rate constant.

Next, a description will be made as to the operation of the imaging device according to embodiment 2 of the present invention. A parameter operation unit 3 calculates imaging parameters associated with the electronic zooming, i.e., the horizontal scanning period PH defined pixel by pixel, the vertical scanning period PV defined line by line based on the magnification for electronic zooming specified by a magnification specification unit 2 by using the following equations (17) and (18), instead of the equations (1) of (2) of above-mentioned embodiment 1.

$$PH=INT\{PHi\times N\} \quad (17)$$

$$PV=INT\{PVi\div N\} \quad (18)$$

where INT is an integerizing function, PHi is the horizontal scanning period set when the magnification for electronic zooming is 1×, PVi is the vertical scanning period set when the magnification for electronic zooming is 1×, and N is the magnification for electronic zooming.

Furthermore, the parameter operation unit 3 calculates a fractional pixel scanning period PR that is a remainder by using the integerizing functions defined in the equations (17) and (18), by using the following equation (19).

$$PR=(PHi\times PVi)-(PH\times PV) \quad (19)$$

At this time, a frame period Fc that is the reciprocal of the frame rate is given by the following equation (20).

$$Fc=PH\times PV+PR \quad (20)$$

There is a relationship given by the following equation (21) in which the fractional pixel scanning period PR is generally smaller than the horizontal scanning period PH.

$$0<PR<PH \quad (21)$$

The parameter operation unit 3 calculates the vertical scanning start line VSTRT, the number VSIZE of vertically scanned rows, the horizontal scanning start pixel HSTRT, and the number HSIZE of horizontally scanned pixels based on the magnification for electronic zooming specified by the magnification specification unit 2 by using the following equations (22) to (25).

$$VSTRT=INT\{VSIZEi\div2\times(1-1/N)\} \quad (22)$$

$$VSIZE=INT\{VSIZEi\div N\} \quad (23)$$

$$HSTRT=INT\{HSIZEi\div2\times(1-1/N)\} \quad (24)$$

$$HSIZE=INT\{HSIZEi\div N\} \quad (25)$$

An imaging control unit 4 specifies a scan region including a region which is to be electronically zoomed in an image sensor unit 1 based on the imaging parameters calculated by the parameter operation unit 3, i.e., the horizontal scanning period PH, the vertical scanning periods PV, the fractional pixel scanning period PR, the vertical scanning start line VSTRT, and the number VSIZE of vertically scanned rows, and controls the scanning timing at which the image sensor unit 1 scans the scan region. FIG. 5 is a diagram for explaining the scan region specified by the imaging control unit 4. When the magnification for electronic zooming is set to N×, the imaging control unit 4 specifies the scan region as PH×PV+PR while specifying the one PHi×PVi when the magnification for electronic zooming is set to 1×, as shown in the figure, and allows the image sensor unit 1 to scan the scan region within one frame of the picture data, the last line of which is increased in size by only the fractional pixel scanning period PR.

FIGS. 6A and 6B are diagrams for explaining the frame rate when the magnification for electronic zooming is changed. FIG. 6A shows a case where the fractional pixel scanning period PR is not included in the scan region, and FIG. 6B shows a case where the fractional, pixel scanning period PR is included in the scan region. In this example, assumes that PHi=800, PVi=580, N=1.2, and PR=320. When the magnification for electronic zooming is changed to 1.2×, PH=800×1.2=960 and PV=580÷1.2=483.333 . . . . Thus, PV doesn't have an integer value which makes the frame rate become constant.

Therefore, while the frame rate changes with a change in the magnification for electronic zooming when the fractional pixel scanning period PR is not included in the scan region, as shown in FIG. 6A, the frame rate doesn't change and can be kept constant when the fractional pixel scanning period PR=320 is included in the scan region because the size of the scan region doesn't change even if the magnification for electronic zooming is changed, as shown in FIG. 6B. As a result, the imaging device can freely change the scan region specified by the imaging control unit 4 in every pixel cycle in which 1-pixel data is read out.

The image sensor unit 1, a register 5, an RW control unit 6, and a resolution converter 7 operate in the same way that those of embodiment 1 do.

The parameter operation unit 3 according to this embodiment calculates the horizontal scanning period PH and the vertical scanning period PV by using the above-mentioned equations (17) and (18). As an alternative, assuming that when the magnification for electronic zooming is set to N1×, the horizontal scanning period is PH1, the vertical scanning period is PV1, the fractional pixel scanning period is PR1, and the central part of one frame of the picture data is electronically zoomed in N2 times, the parameter operation unit 3 calculates the horizontal scanning period PH2, the vertical scanning period PV2, and the fractional pixel scanning period PR2 at the time of the N2× magnification for electronic zooming, by using the following equations (26) to (28).

$$PH2=INT\{PH1\times(N2/N1)\} \quad (26)$$

$$PV2=INT\{PV1\div(N2/N1)\} \quad (27)$$

$$PR2=PH1\times PV1+PR1)-(PH2\times PV2) \quad (28)$$

As mentioned above, in accordance with this embodiment 2, the imaging control unit 4 specifies the scan region scanned by the image sensor unit 1 based on the magnification for electronic zooming so that the scan region includes a fractional pixel scanning period PR, and makes a correction to variations in the data rate which occur with a change in the magnification for electronic zooming of the picture data delivered from the image sensor unit 1 by using the register 5 having a small capacity. Therefore, the present embodiment offers an advantage of being able to keep the frame rate constant even though any magnification is set for electronic zooming even when performing electronic zooming without having to use a frame memory having a large storage amount.

Furthermore, the second embodiment offers another advantage of being able to freely select the frame rate in every pixel cycle.

Embodiment 3.

An imaging device according to embodiment 3 of the present invention has the same structure as that of above-mentioned embodiment 1 as shown in FIG. 1. The imaging device according to above-mentioned embodiment 2 provides the horizontal scanning period. PHi and the vertical scanning period PVi set for the 1× magnification for electronic zooming in advance. In contrast, the imaging device according to this embodiment 3 provides the horizontal scanning period PHi and a frame period Fc which is a reciprocal of the frame rate which are set for the 1× magnification for electronic zooming.

Next, a description will be made as to the operation of the imaging device according to embodiment of 3 of the present invention. A parameter operation unit 3 calculates the vertical scanning period PVi and the fractional pixel scanning period PRi set for the 1× magnification for electronic zooming by using the following equations (29) and (30).

$$PVi=INT(Fc\div PHi) \quad (29)$$

$$PRi=Fc-(PHi\times PVi) \quad (30)$$

The parameter a operation unit 3 calculates the horizontal scanning period PH that is defined pixel by pixel and is set for the N× magnification for electronic zooming by using the above-mentioned equation (17), calculates the vertical scanning period PV by using the following equation (31) instead of the above-mentioned equation (18), and calculates the fractional pixel scanning period PR by using the following equation (32).

$$PV=INT\{Fc\div PH\} \quad (31)$$

$$PR=Fc-(PH\times PV) \quad (32)$$

Thus, the parameter operation unit 3 calculates the imaging parameters by using the horizontal scanning period PH and the frame period Fc. After that, the imaging device performs the other processes in the same way that that of embodiment 2 does.

In accordance with this embodiment, the parameter operation unit 3 calculates the vertical scanning period PVi and the fractional pixel scanning period PRi for the 1× magnification for electronic zooming by using the above-mentioned equations (29) and (30), and calculates the horizontal scanning period PH, the vertical scanning period PV, and the fractional pixel scanning period PR for the N× magnification for electronic zooming by using the equations (17), (31), and (32). Assuming that the horizontal scanning period is PH1 and the frame period is Fc when the magnification for electronic zooming is set to N1×, and the central part of one frame of the picture data is electronically zoomed in two times, the parameter operation unit 3 calculates the vertical scanning period PV1 and the fractional pixel scanning period PR for the N1× magnification for electronic zooming, and the horizontal scanning period PH2, the vertical scanning period PV2, and the fractional pixel scanning period PR2 for the N2× magnification for electronic zooming by using the following equations (33) to (37).

$$PV1=INT\{Fc\div PH1\} \quad (33)$$

$$PR1=Fc-(PH1\times PV1) \quad (34)$$

$$PH2=INT\{PH1\times(N2/N1)\} \quad (35)$$

$$PV2=INT\{Fc\div PH2\} \quad (36)$$

$$PR2=Fc-(PH2\times PV2) \quad (37)$$

As mentioned above, this embodiment 3 offers advantages of being able to keep the frame rate constant when performing electronic zooming without having to use a large-capacity frame memory even though any magnification is set for the electronic zooming, like above-mentioned embodiment 2, and being able to freely select the frame rate in every pixel cycle.

Many widely different embodiments of the present invention may be constructed without departing from the spirit and scope of the present invention. It should be understood that the present invention is not limited to the specific embodiments described in the specification, except as defined in the appended claims.

What is claimed is:

1. An imaging device comprising:
    an image sensor unit for converting an input optical signal into an electrical signal, for storing the electrical signal, for reading the electrical signal stored, and for outputting the electrical signal read as picture data;
    a magnification specification unit for setting a magnification for electronic zooming;
    a parameter operation unit for calculating imaging parameters associated with the electronic zooming based on the magnification for electronic zooming specified by the magnification specification unit;
    an imaging control unit for specifying a scan region, including an effective pixel region and a blanking region, of an image which is to be scanned by said image sensor unit, based on the imaging parameters calculated by said parameter operation unit, and for controlling scanning timing at which said image sensor unit scans the scan region;
    a register for temporarily holding a part of the picture data output from said image sensor unit;
    a read write (RW) control unit for writing in said register at least one line of the picture data delivered from said image sensor unit based on the imaging parameters calculated by said parameter operation unit, and for reading the at least one line of the picture data at a fixed frame rate independent of the magnification; and
    a resolution converter for interpolation processing of the picture data read from said register based on the imaging parameters calculated by said parameter operation unit, converting the picture data into picture data having a size of one frame, and delivering the one frame as a video signal.

2. The imaging device according to claim 1, wherein
    said parameter operation unit calculates, as imaging parameters, horizontal scanning period and vertical scanning period for a second magnification for electronic zooming using a ratio of a first magnification for electronic zooming and the second magnification and an integerizing function based on a horizontal scanning period, a frame period defining frame rate, number of vertically scanned rows, and number of horizontally scanned pixels for the first magnification, calculates a fractional pixel scanning period that is a remainder, using the integerizing function, and calculates vertical scanning start line, number of vertically scanned rows, horizontal scanning start pixel, and number of horizontally scanned pixels for the second magnification,
    said imaging control unit specifies the scan region based on the horizontal scanning period, the vertical scanning period, the vertical scanning start line, and the number of vertically scanned rows for the second magnification,
    said RW control unit writes at least one line of picture data in said register based on the horizontal scanning start pixel and the number of horizontally scanned pixels for the second magnification, and
    said resolution converter performs the interpolation processing based on the horizontal scanning start pixel and the number of horizontally scanned pixels for the second magnification.

3. The imaging device according to claim 1, wherein
    said parameter operation unit calculates, as the imaging parameters, horizontal scanning period, vertical scanning period, vertical scanning start line, number of vertical scanned rows, horizontal scanning start pixel, and number of horizontal scanned pixels for a second magnification for electronic zooming, based on the horizontal scanning period, the vertical scanning period, the number of vertical scanned rows, and the number of horizontal scanned pixels for a first magnification for electronic zooming,
    said imaging control unit specifies the scan region based on the horizontal scanning period, the vertical scanning period, the vertical scanning start line, and the number of vertical scanned rows for a second magnification, and
    said RW control unit writes at least one line of the picture data in said register based on the horizontal scanning start pixel and the number of horizontal scanned pixels for the second magnification, and said resolution converter performs the interpolation processing based on the horizontal scanning start pixel and the number of horizontal scanned pixels for the second magnification.

4. The imaging device according to claim 3, wherein said parameter operation unit calculates the horizontal scanning period and the vertical scanning period for the second magnification using a ratio of the first and second magnifications.

5. The imaging device according to claim 4, wherein said parameter operation unit calculates the horizontal scanning period and the vertical scanning period for the second magnification, using an integerizing function, and calculates a fractional pixel scanning period that is a remainder, using the integerizing function, and said imaging control unit specifies the scan region including a fractional pixel scanning period.

* * * * *